Oct. 20, 1942.  J. A. MULLER  2,299,172
ROTARY HOSE COUPLING ASSEMBLY
Filed Dec. 10, 1941
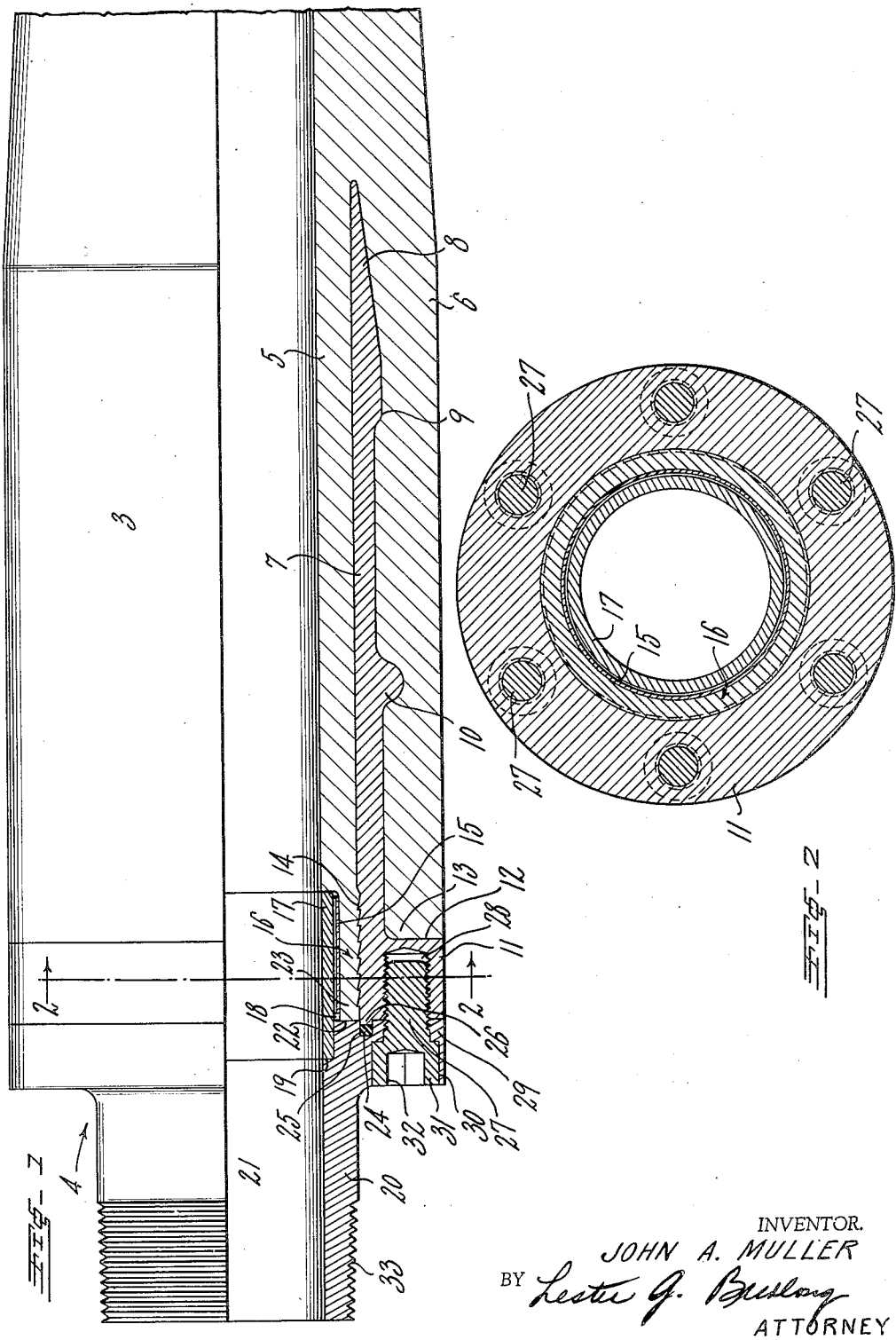
INVENTOR.
JOHN A. MULLER
BY Lester J. Burlong
ATTORNEY

UNITED STATES PATENT OFFICE 2,299,172

ROTARY HOSE COUPLING ASSEMBLY

John A. Muller, Ridgewood, N. J., assignor to United States Rubber Company, New York, N. Y., a corporation of New Jersey Application December 10, 1941, Serial No. 422,313

1 Claim. (Cl. 285—78)

This invention relates to high pressure hose, especially to a coupling member for the end of such a hose, and more particularly to an improvement upon the type of coupling forming the subject-matter of my Patent No. 2,234,350 dated March 11, 1941.

In general the primary purpose of the instant invention is to provide a high pressure hose and end coupling construction especially but not exclusively adapted for use in high pressure drilling operations such as rotary drilling operations in oil fields, which hose will be strong, durable and efficient and, at the same time, of economic construction and of compact arrangement.

Pressures encountered in present day oil well drilling operations range to thousands of pounds per square inch, and the demands for these pressures and more efficient well drilling apparatus have made it necessary to provide improved hose and end coupling constructions, inasmuch as conventional hose and end couplings which functioned satisfactorily for low pressure ranges of operation were found to be totally inadequate to sustain present day pressures.

Other objects and features of the invention will appear as progress is made in the description of the selected embodiment of the invention illustrated in the accompanying drawing, wherein:

Fig. 1 is a view in longitudinal elevation of a hose in the construction of which the present invention has been embodied, with the lower part of the hose and its associated parts shown in vertical, longitudinal section; and Fig. 2 is a view in transverse vertical section, taken on the line 2—2 of Fig. 1.

Referring to the drawing, and in particular to Fig. 1, there is shown a high pressure hose 3 of the type employed in present day oil well drilling operations, and an end coupling assembly designated generally by the reference character 4, joined together to form a complete substantially smooth structure.

The end of hose 3 comprises an inner tubular wall or carcass 5 and an outer tubular wall 6, having their ends positioned upon opposite sides of an elongated tubular nipple part 7 of the end coupling assembly, and so constructed and arranged as to be firmly secured relatively thereto, the tubular nipple portion 7 being of such size as to fit closely about the outer surface of the carcass 5 and to be surrounded in its turn by the outer tubular wall 6, and it will be understood that if the walls 5 and 6 be of a laminated structure, according to known practice in the art of hose making, the outer wall portion 6 can be built up on the nipple part 7, after the latter has been placed in position upon its wall or carcass 5.

So far as suitable and desirable the laminated structure of the hose 3 may follow the general type of which an example is illustrated in my aforesaid Letters Patent No. 2,234,350, making proper allowances for differences in the end coupling structure 4 which will now be duly pointed out.

Circumferential ribs 9 and 10 aid to prevent coaxial displacement of the hose 3 outwardly along the nipple, and a shoulder 11 formed integrally with the nipple constitutes an abutment 12 for the contiguous end 13 of the outer ply or plies 6 of the hose.

The nipple 7 is provided near its mouth with rugosities, as at 14, and a sturdy metallic expansion ring 15 of proper size is expanded firmly into place by any suitable expanding tool so as to force the surrounding mouth 16 of the ply or plies 5 into positive engagement with the rugosities 14. An expansion ring protector 17 of predetermined size and shape is arranged to fit within the recess 18 which is occupied by the expansion ring 15, and into a complemental recess 19 provided in the inner bore 21 of the coupling member 20, to protect the expansion ring from abrasion by mud pumped through the hose.

In order to complete the seal at this region a packing ring 24 is provided in a groove 25 in the inner face of the coupling member 20, being completely enclosed by a circular rib 26 suitably disposed on the contiguous face of the nipple 7.

In pursuance of the present invention, a set of spaced bolts 27 are provided, to afford a sturdy union between the shoulder 11 on the nipple 7 (which is provided with tapped sockets 28 to receive the bolts), and a circular flange 29, of like diameter, having recesses 30 in which fit snugly the heads 31 of the bolts, the latter having squared recesses 32 to receive a squared-end tool for use in driving the bolts home. The end 33 of the coupling member 20 is threaded suitably to facilitate connection of the hose and end coupling to a drill head.

From the foregoing disclosure, it will be apparent that I have provided for carrying into effect the several objects stated in the opening paragraphs of this invention, and have produced a structure which is strong and efficient.

This construction is such that the greater the internal pressure becomes the greater the sealing effect becomes between the hose and end coupling assemblies. Also the internal diameter throughout the entire length of the hose and coupling assembly remains constant and does not, at any place, impede the flow or reduce the internal bore of the construction. The external diameter of the hose and end coupling assembly is but slightly larger than the external diameter taken at other points along the hose, no objectionable projections being present upon the outer surface of the hose assembly to interfere with its efficient operation and its ease of handling. It is not necessary in the use of the constructions of my invention to adjust or maintain parts of the structure after they have been properly assembled for well drilling operations. The substantially straight cylindrical wall construction of the hose and end coupling constructions of my invention produce structures which may be easily, quickly and economically built without the necessity of shaping and forming irregular parts.

Although the invention has been described in connection with the specific details of preferred embodiments thereof it should be understood that such details are not intended to be limitative of the invention except insofar as set forth in the accompanying claim.

Having thus described my invention, what I claim and desire to secure by Letters Patent is:

A unitary high pressure hose and coupling construction comprising in combination, a hose having inner and outer cylindrical walls, an elongated tubular nipple extending between the walls and in sealing contact with said walls, an integral circular flange projecting radially from the nipple outside of the walls and having a diameter substantially equal to the diameter of the outer wall to provide a smooth exterior surface on the hose and coupling, said flange having a radial surface forming an abutment for the end of said outer wall, a coupling member having a radial flange whose outer diameter is substantially equal to that of the outer wall of the hose and whose inner diameter is substantially equal to the inner diameter of the inner wall of the hose to provide a smooth interior surface for said hose and coupling, said last mentioned flange having a radial surface forming an abutment for said inner wall of the hose, one of said flanges having an axially projecting circular rim of substantially the diameter of said thimble and co-axial therewith and the other of said flanges having a corresponding groove, a packing ring in said groove, and bolts located wholly within said flanges for drawing the flanges into sealing engagement with the packing ring, said bolts being located radially outside of the tubular nipple and within the circumference of said outer wall of the hose.

JOHN A. MULLER.